US005506889A

United States Patent [19]

Gustafson et al.

[11] Patent Number: 5,506,889

[45] Date of Patent: Apr. 9, 1996

[54] DIGITAL VOICE PRIVACY APPARATUS AND METHOD

[75] Inventors: David T. Gustafson, Gilbert; Paul R. Kennedy, Mesa; Shirley H. Lee, Chandler; James B. Piket, Gilbert, all of Ariz.

[73] Assignee: Motorola, Inc., Schaumburg, Ill.

[21] Appl. No.: 315,721

[22] Filed: Sep. 30, 1994

[51] Int. Cl.$^{6}$ ....................................................... H04Q 7/38

[52] U.S. Cl. ............................... 379/59; 455/33.1; 380/28

[58] Field of Search ............................. 379/59; 455/33.1; 380/28, 29, 31, 33

[56] References Cited

U.S. PATENT DOCUMENTS

| | | | |
|---|---|---|---|
| 4,182,933 | 1/1980 | Rosenblum . | |
| 4,972,479 | 11/1990 | Tobias | 380/31 |
| 5,060,266 | 10/1991 | Dent | 379/59 |
| 5,150,401 | 9/1992 | Ashby, III et al. | 380/29 |
| 5,305,384 | 4/1994 | Ashby et al. | 380/29 |

*Primary Examiner*—Dwayne D. Bost
*Attorney, Agent, or Firm*—Frank J. Bogacz

[57] ABSTRACT

A cellular voice privacy arrangement includes a digital privacy unit which is part of each subscriber's fixed equipment. The digital privacy unit includes suitable analog to digital and digital to analog converters. A vocoder, digital signal processor and modem provide the privacy. The identification numbers of each terminal (phone) are exclusive-ORed to form a scramble variable. Vocoder data (voice coded information) is exclusive-ORed with the scramble variable to provided scrambled data for transmission.

12 Claims, 3 Drawing Sheets

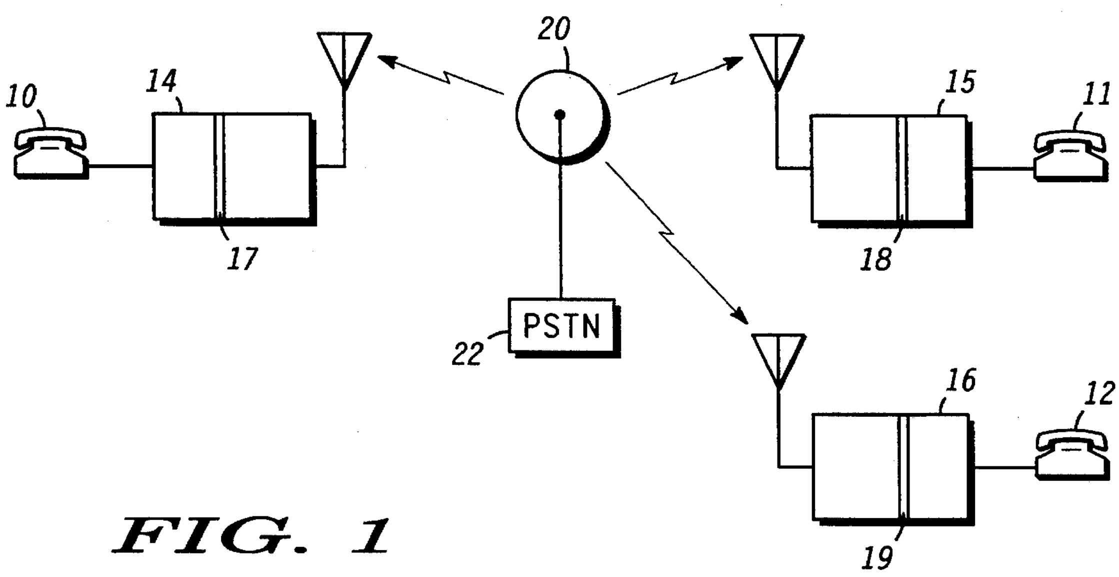
FIG. 1
FIG. 2
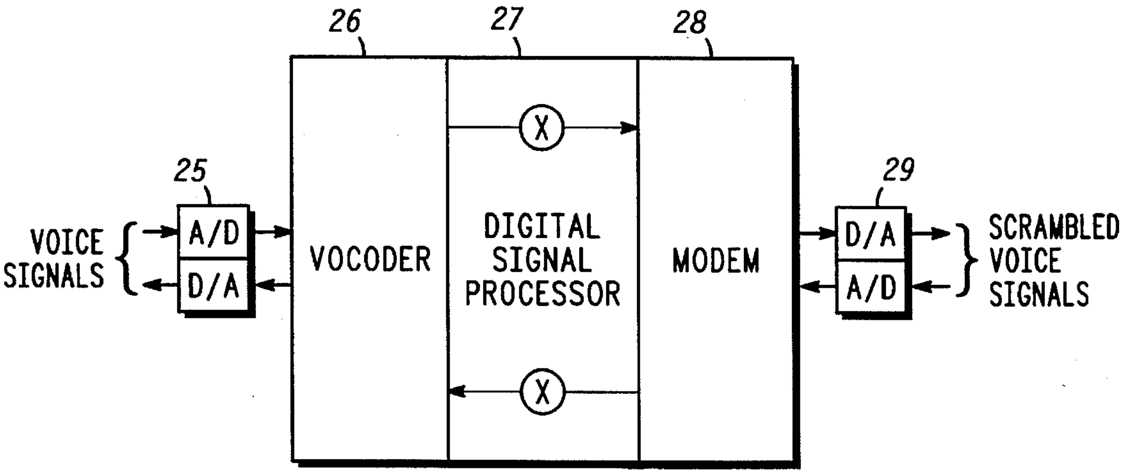

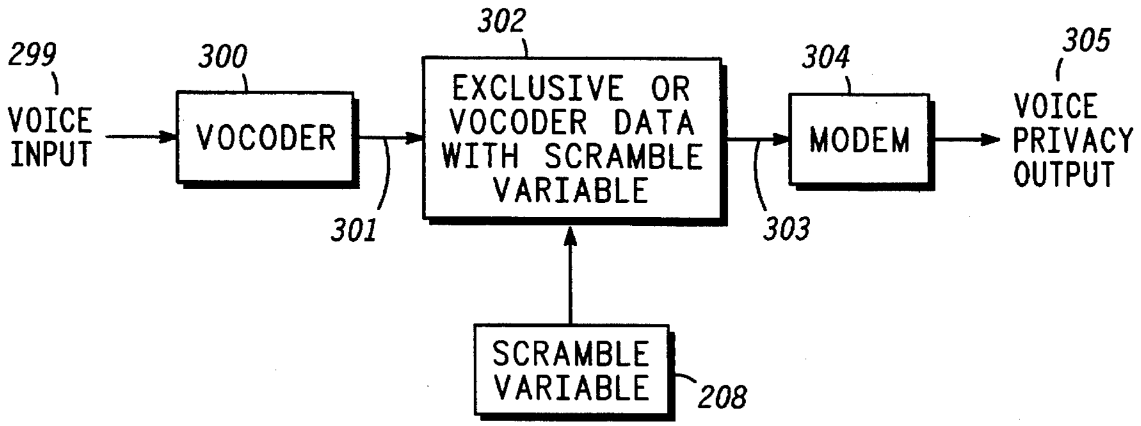
FIG. 3
FIG. 4
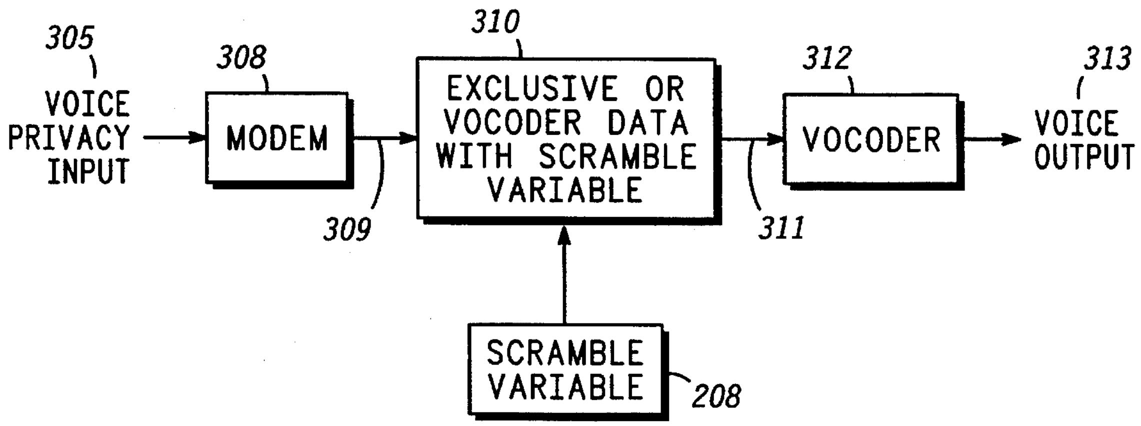

DIGITAL VOICE PRIVACY APPARATUS AND METHOD

BACKGROUND OF THE INVENTION

The present invention pertains to secure end-to-end telecommunications and more particularly digital voice privacy in a cellular telecommunication system.

Currently commercial voice privacy is available over the public switched telephone network (PSTN).

Such commercially available voice privacy arrangements employ the use of analog scrambling of an analog baseband signal in the range of 300 to 3400 Hz. These commercially available voice privacy implementations use either frequency inversion or frequency modulation techniques. The quality level of the descrambled voice is poor at best and is dependent upon a number of parameters, such as telephone line quality, number of telecommunication transfers (hops) and number of exchanges to make the connection.

The cost of telephone elements is very important when providing service to highly populated relatively poor countries. Analog scramblers, as mentioned above, are used primarily because of the low cost to implement such technology. As a result, cost is a very important factor in the selection of telephone equipment in poorer countries.

In addition, scrambling technology may be regulated by the U.S. State Department and the National Institute of Standards (NIST) depending on the level of their complexity. As a result, this technology is more difficult to export by U.S. manufacturers to foreign countries as commercial products.

As a result, it would be desirable to have a low cost apparatus and method of scrambling which is digital in nature and provides upward compatibility to higher levels of security while maintaining a relatively high level of voice quality. In addition, it is desirable that the method of scrambling be simple enough so that only U.S. Department of Commerce approval will be required for export of the telephone components.

BRIEF DESCRIPTION OF THE DRAWINGS

FIG. 1 is a block diagram of a cellular calling arrangement employing digital privacy in accordance with the present invention.

FIG. 2 is a block diagram of the digital privacy unit of FIG. 1 in accordance with the present invention.

FIG. 3 is a block diagram of a digital voice scrambler in accordance with the present invention.

FIG. 4 is a block diagram of a voice descrambler in accordance with the present invention.

DESCRIPTION OF THE PREFERRED EMBODIMENT

Figure 5:
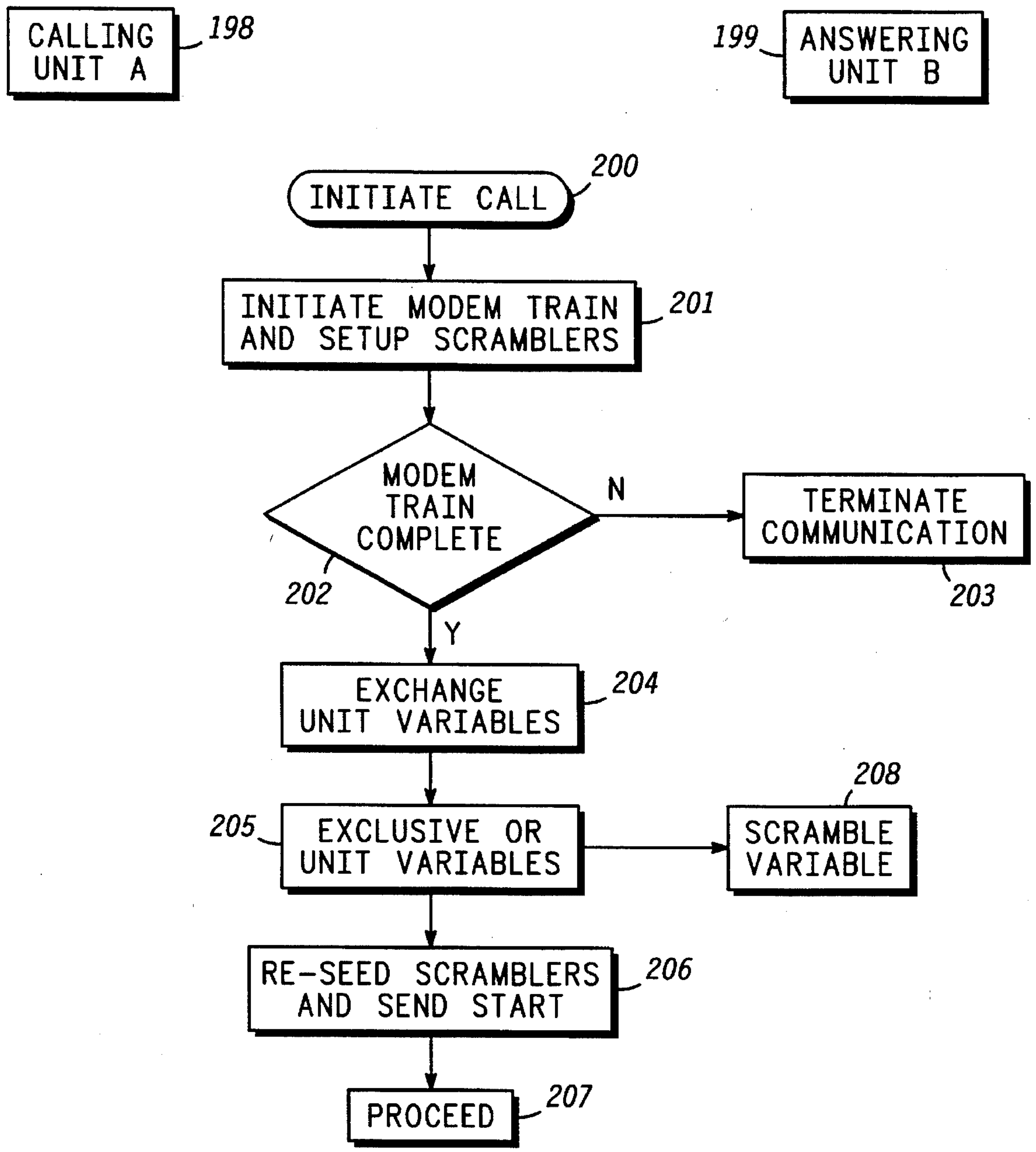
FIG. 5 is a flow chart of a voice privacy call setup method in accordance with the present invention.

This invention provides privacy for any secure end-to-end communications which do not require a high level of privacy.

Referring to FIG. 1 a block diagram of a digital voice privacy network is shown. Three telephone subscribers 10, 11, and 12 are shown connected through a cell site 20 of a cellular network (not shown) to one another. Telephone 10 may be connected to either telephone 11 or 12. Similarly, telephone 11 may be connected with telephone 12. Each of the telephones require only a level of plain old telephone service (POTS). Each of the cell sites of the cellular system such as cell site 20 may be connected to the public switch telephone network (PSTN) 22.

Each telephone 10, 11, and 12 includes a fixed subscriber unit 14, 15, and 16 respectively. Each of the fixed subscriber units 14, 15, and 16 includes a digital privacy unit 17, 18, and 19 respectively. The digital privacy unit secures each of the links between telephone 10 and 11, telephone 10 and 12, and telephones 11 and 12. When a call is established between telephone 10 and 11, for example, a scrambler will be set up for the call and a connection between telephones 10 and 11 will be privatized. Each connection between two telephones in the system results in the generation of a unique scramble variable, such that one call may not generate a scrambler variable to intercept voice transmissions on another telephone call.

Each time any call is completed between the telephones 10, 11, and 12, the same scramble variable will result. This is an attractive feature for privacy in poor countries since the results of the connection are predictable. Predictable results provide that government agencies can enforce their rights concerning information regarding political, economic, and military affairs. In addition, predictable results technology are readily exportable to foreign countries since the U.S. Government may predict the results as well.

The fixed subscriber with digital privacy provides poorer countries of the world a quick way to install a phone in a residence or a business since cellular applications do not require the infrastructure including phone lines which are expensive to install.

Referring to FIG. 2, a block diagram of the digital privacy unit 17, 18 or 19 or FIG. 1 is shown. Analog/digital and digital/analog converters 25 interface voice signals to the subscriber's telephone 10, 11, and 12. Similarly, digital/analog and analog/digital converter 29 interface scrambled voice signals received from the cellular network to the digital privacy unit.

Vocoder 26 is coupled between analog/digital and digital/analog converter 25 and digital signal processor 27. Vocoder 26 provides a voice compression function of signals transmitted to and from the subscriber's telephone 10. Modem 28 is coupled between digital signal processor 27 and digital/analog and analog/digital converter 29. The privacy or scrambling function is located in the digital processor 27 which is coupled to modem 28 and vocoder 26. The scrambler function of the digital signal processor 27 uses some attributes of the modems scrambler to achieve a unique scramble pattern for each call.

The modem function of modem 28 is a V.32 modem which uses a self-synchronizing scrambler/descrambler. The scrambler/descrambler is keyed to the performance of the echo canceler. Depending on the direction of transmission, a generating polynomial is used as follows:

$$\text{Generating Polynomial Caller (GPC) equals } 1+X^{-18}+X^{-23}$$

and $$\text{Generating Polynomial Answer (GPA) equals } 1+X^{-5}+X^{-23}$$

The transmitter of either the GPA or GPC scramblers effectively divides the message data sequence from the vocoder by the generating polynomial. The coefficient of the quotients of this division taken in descending order form the data sequence which appears at the output of the scrambler.

At the receiver end of the data sequence, the data is multiplied by the scrambler generating polynomial to recover the message sequence.

The scrambler function combines the GPA and GPC scramblers with a unique variable to provide privacy to the communication link between telephones.

The vocoder 26, digital signal processor 27 and modem 28 may be implemented on a single integrated circuit, such as an application specific integrated circuit.

FIG. 3 is a block diagram of a voice scrambler. The voice scrambling is accomplished by using the scramble variable 208 to exclusive-OR with the digital and compressed voice output 301. The voice input 299 is fed into the vocoder 300 to be digitized and compressed. The digitized and compressed voice output 301 is exclusive-ORed, in block 302, with the scramble variable 208 which provides the resultant 304 which will scramble the data once again with the re-seeded scrambler from FIG. 5. The resultant voice privacy output 305 is what is sent over the communications link between unit A 198 and unit B 199.

FIG. 4 is a block diagram of a voice descrambler. The voice de-scrambling is accomplished by using the same scramble variable 208 to perform the same operations as in the scrambling operation in FIG. 3. The voice privacy output 305 is received by the modem 308 and descrambled after passing through the modem scramblers (which have been re-seeded with the scramble variable 208 previously discussed in FIG. 5). The digitized, compressed, and scrambled output 309 from the modem 308 is exclusive ORed in block 310 with the scramble variable 208 to produce the digitized and compressed voice output 311. The digitized and compressed voice output 311 is fed into the vocoder 312 to be uncompressed and synthesized as a voice output 313.

FIG. 5 is a flow chart which shows the call setup of the voice privacy invention. Unit A 198 and unit B 199 are needed to setup the voice privacy link. In FIG. 5 a call is initiated 200 when one unit calls the other. The calling unit initiates the modem training sequence 201 and both the calling and answering units begin modem training. During the modem training each of the units will setup the modem scramblers 201 so that the transmitted output of each unit will be different from the received input. Once the modem training is complete 202 (the scramblers within calling/answering modems have been set with a predetermined value) unit A 198 and unit B 199 will exchange unit variables 204 and create a scramble variable 208 by performing an exclusive OR using the unit variables. The resultant scramble variable 208 will be the same in each unit. After the scramble variable 208 is generated the modem scramblers are re-seeded 206 and a new start is sent 206 so that the scramblers are synchronized. The voice privacy link is now set for providing the next layer in the voice privacy communications.

The present invention provides a low cost digital signal processor which has high voice quality and is relatively immune to the level of encryption applied to the voice signals. As a result, the low cost digital signal processor allows migration to higher levels of security and widespread application to many products. In addition, the digital processor generates a unique per call variable which provides strong privacy to prevent eavesdropping by casual listeners and at the same time predictable enough such that the U.S. State Department will not be interested in regulating the privacy function. This will allow sales of such telephone systems in many of the poorer countries of the world which have great population and need for widespread telecommunications.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A digital voice privacy unit for providing secure communications between subscribers' telephones in a telecommunication system, said digital voice privacy unit comprising:

a vocoder for converting voice information of a first telephone to digital data;

a digital signal processor for scrambling said digital data of said first telephone with a scramble variable to produce scrambled digital data, said digital signal processor coupled to said vocoder;

said digital signal processor includes means for producing said scramble variable;

said first telephone and said second telephone each include an identification number;

said means for producing includes first means for exclusive-ORing said identification number of said first telephone with said identification number of said second telephone; and a modem for transmitting said scrambled digital data to a second telephone via said telecommunication system, said modem coupled to said digital signal processor and to said telecommunication system.

2. A digital voice privacy unit as claimed in claim 1, wherein there is further included second means for exclusive-ORing said scramble variable with said digital data to produce said scrambled digital data.

3. A digital voice privacy unit as claimed in claim 1, wherein said telecommunication system includes a cellular telecommunication system.

4. A digital voice privacy unit as claimed in claim 1, wherein said vocoder, said digital signal processor, and said modem are each included on a single integrated circuit.

5. A digital voice privacy unit for providing secure communications between subscribers' telephones in a telecommunication system, said digital voice privacy unit comprising:

a modem for receiving scrambled digital data from a first telephone via said telecommunication system;

a digital signal processor for descrambling said scrambled digital data of said first telephone with a scramble variable to produce digital data, said digital signal processor coupled to said modem;

said digital signal processor includes means for producing said scramble variable;

said first telephone and said second telephone each include an identification number;

said means for producing includes first means for exclusive-ORing said identification number of said first telephone with said identification number of said second telephone; and a vocoder for converting said digital data to voice information for a second telephone, said vocoder coupled to said digital signal processor.

6. A digital voice privacy unit as claimed in claim 5, wherein there is further included second means for exclusive-ORing said scramble variable with said digital data to produce said scrambled digital data.

7. A digital voice privacy unit as claimed in claim 5, wherein said telecommunication system includes a cellular telecommunication system.

8. A digital voice privacy unit as claimed in claim 5, wherein said vocoder, said digital signal processor, and said modem are each included on a single integrated circuit.

9. A method for digital voice privacy between a first telephone and a second telephone of a telecommunication system, said method comprising the steps of:

training a modem of said first telephone and a modem of said second telephone to establish a connection between said first telephone and said second telephone;

exchanging by said first telephone and said second telephone a first identification number of said first telephone and a second identification number of said second telephone;

producing a scramble variable by said first telephone and said second telephone from said first identification number and said second identification number;

said step of producing a scramble variable includes the step of exclusive-ORing said first identification number and said second identification number;

converting by a vocoder voice information of said first telephone to digital data;

scrambling by a digital signal processor said digital data of said first telephone with said scramble variable to produce scrambled digital data; and transmitting by a modem said scrambled digital data of said first telephone to a modem of said second telephone.

10. A method for digital voice privacy as claimed in claim 9, wherein there is further included the step of converting said scrambled digital data to analog data for transmission to said second telephone.

11. A method for digital voice privacy as claimed in claim 10, wherein there is further included the step of converting said analog data received by said second telephone to scrambled digital data.

12. A method for digital voice privacy as claimed in claim 9, wherein there is further included the steps of:

receiving by said modem of said second telephone said scrambled digital data;

descrambling by a digital signal processor of said second telephone said scrambled digital data to produce digital data; and converting by a vocoder of said second telephone said digital data to voice information.

* * * * *